(12) United States Patent
Xiong

(10) Patent No.: US 11,454,375 B1
(45) Date of Patent: Sep. 27, 2022

(54) PROJECTION LAMP CAPABLE OF SIMULTANEOUSLY ACHIEVING MULTIPLE EFFECTS

(71) Applicant: Ligao Xiong, Zhongshan (CN)

(72) Inventor: Ligao Xiong, Zhongshan (CN)

(*) Notice: Subject to any disclaimer, the term of this patent is extended or adjusted under 35 U.S.C. 154(b) by 0 days.

(21) Appl. No.: 17/561,759

(22) Filed: Dec. 24, 2021

(51) Int. Cl.
*F21K 9/66* (2016.01)
*F21V 14/06* (2006.01)
*G02B 27/42* (2006.01)
*G02B 7/02* (2021.01)
*F21W 121/00* (2006.01)
*F21Y 115/10* (2016.01)

(52) U.S. Cl.
CPC .............. *F21V 14/06* (2013.01); *G02B 7/021* (2013.01); *G02B 27/425* (2013.01); *F21W 2121/008* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 2016/0209013 A1* | 7/2016 | Chien | F21V 14/02 |
| 2017/0219176 A1* | 8/2017 | Chang | A63J 5/025 |
| 2018/0119908 A1* | 5/2018 | Chien | G03B 23/00 |

* cited by examiner

*Primary Examiner* — Elmito Breval
(74) *Attorney, Agent, or Firm* — Rumit Ranjit Kanakia

(57) ABSTRACT

The present utility model discloses a projection lamp capable of simultaneously achieving multiple effects. The projection lamp includes a housing formed by connecting an upper housing and a lower housing, wherein a first projection module, a second projection module and a third projection module are arranged in the housing; the first projection module includes a first rotating motor, an LED lamp panel, a rotating disc, a plurality of small lenses and a first transparent sheet; the first rotating motor is arranged at the bottom of the LED lamp panel; one end of a rotating shaft of the first rotating motor extends out of the LED lamp panel; the plurality of small lenses are arranged in the rotating disc; the rotating disc and the first transparent sheet are connected to one end of the rotating shaft in a penetrating mode; a continuous irregular concave-convex surface is arranged on the surface of the first transparent sheet; the first projection module is used for forming the effect of mist and clouds floating in the starry sky; the second projection module is used for forming the effect of twinkling stars; and the third projection module is used for forming the effect of different shapes of quasi-nebulae or clouds.

10 Claims, 4 Drawing Sheets

PROJECTION LAMP CAPABLE OF SIMULTANEOUSLY ACHIEVING MULTIPLE EFFECTS

TECHNICAL FIELD

The present utility model relates to the technical field of lamps for creating an atmosphere, in particular to a projection lamp capable of simultaneously achieving multiple effects.

BACKGROUND

With the development of society, people's requirements for living standards are higher and higher, and more and more people begin to pursue the quality of life. For example, people are beginning to pay attention to lighting lamps, but the current lighting lamps on the market only have the function of lighting, and have a single emitted light element and a monotonous lighting atmosphere, and thus it is easy to cause visual aesthetic fatigue for users. With the improvement of the life quality of people, people have more requirements on the lighting atmosphere. Lighting lamps that can only emit monotonous light are far from meeting the requirements of people. People are beginning to pay attention to lighting lamps that can create a wonderful lighting atmosphere. Therefore, there is an urgent need for a lamp that can create a variety of wonderful lighting atmospheres to meet the requirements of consumers.

SUMMARY

Aiming at the defects of the prior art, the present utility model aims to provide a projection lamp capable of simultaneously achieving multiple effects; specifically, 3 different projection modules can respectively form the effect of nebulae and iridescent clouds, the effect of different shapes of nebulae or iridescent clouds, and the effect of twinkling stars, which brings different visual enjoyment to users.

To achieve the above purposes, the present utility model adopts the following technical scheme:

a projection lamp capable of simultaneously achieving multiple effects includes a housing formed by connecting an upper housing and a lower housing, wherein a first projection module, a second projection module and a third projection module are arranged in the housing; the first projection module includes a first rotating motor, an LED lamp panel, a rotating disc, a plurality of small lenses and a first transparent sheet; the first rotating motor is arranged at the bottom of the LED lamp panel; one end of a rotating shaft of the first rotating motor extends out of the LED lamp panel; the plurality of small lenses are arranged in the rotating disc; the rotating disc and the first transparent sheet are connected to one end of the rotating shaft in a penetrating mode; a continuous irregular concave-convex surface is arranged on the surface of the first transparent sheet; the first projection module is used for forming the effect of mist and clouds floating in the starry sky; the second projection module is used for forming the effect of twinkling stars; and the third projection module is used for forming the effect of different shapes of quasi-nebulae or clouds.

It should be noted that the continuous irregular concave-convex surface arranged on the surface of the first transparent sheet is arranged to achieve the effect of mist and clouds floating in the starry sky; and furthermore, the concave-convex surface can be in a continuous concave-convex uneven shape, or in a wavelike continuous fluctuating shape.

It should be noted that the second projection module of the present utility model includes a second rotating motor, a first laser, a DOE optical sheet and a grid sheet; the grid sheet is arranged on a rotating shaft extending out of the second rotating motor; the first laser is arranged on one side of the second rotating motor and parallel to the second rotating motor; and the DOE optical sheet and the first laser are coaxially arranged and the DOE optical sheet is located at the bottom of the grid sheet.

It should be noted that the orthographic projection of the DOE optical sheet of the present utility model is located in the grid sheet.

It should be noted that the third projection module of the present utility model includes a third rotating motor, a second laser, a reflection sheet and a second transparent sheet; the second transparent sheet is arranged on a rotating shaft extending out of the third rotating motor; the reflection sheet is arranged at one end of the second laser; the second laser is arranged on one side of the third rotating motor and perpendicular to the third rotating motor; and a laser beam of light emitted by the second laser and reflected by the reflection sheet is projected from the bottom of the second transparent sheet.

It should be noted that the continuous irregular concave-convex surface is arranged on the surface of the second transparent sheet of the present utility model.

It should be noted that mounting holes with the same number as the small lenses are formed in the rotating disc of the present utility model.

It should be noted that bearing brackets extending vertically downwards are arranged on the periphery of each mounting hole of the present utility model, and the plurality of small lenses are arranged in the bearing brackets.

It should be noted that a hemispherical transparent cover is arranged on the surface of the upper housing of the present utility model, the hemispherical transparent cover and the rotating disc are coaxial in position, and a plurality of optical lenses are arranged on the inner surface of the hemispherical transparent cover.

It should be noted that a first transparent cover plate and a second transparent cover plate are further arranged on the surface of the upper housing of the present utility model, the second projection module performs projection through the first transparent cover plate, and the third projection module performs projection through the second transparent cover plate.

It should be noted that the projection lamp provided by the present utility model further includes a control circuit, the control circuit being electrically connected to the first projection module, the second projection module and the third projection module respectively.

The present utility model has the beneficial effects as follows:

1. 3 different projection modules are provided, and can be applied to independent display or mixed display according to different needs;

2. Each independent module represents a kind of projection effect, respectively being the effect of nebulae and iridescent clouds, the effect of different shapes of nebulae or iridescent clouds, and the effect of twinkling stars.

3. Different effect changes are formed through the combination of the different modules.

DETAILED DESCRIPTION

The present utility model will be further described below with reference to the accompanying drawings, it should be noted that the following embodiments give out detailed implementation modes and specific operation processes on the basis of the technical scheme provided by the present utility model, but the protection scope of the present utility model is not limited to the embodiments.

Figure 1:
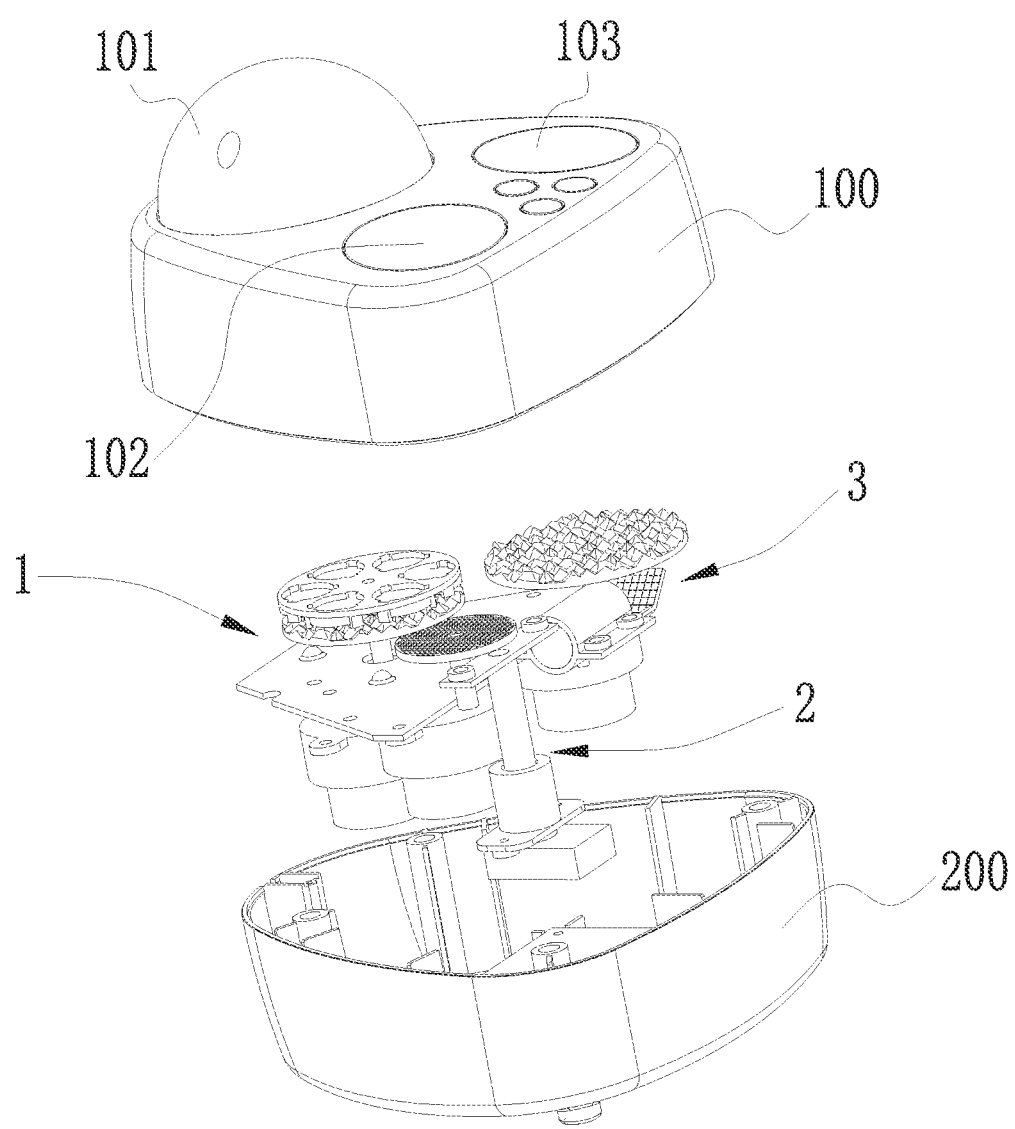
FIG. 1 is a schematic structure diagram of the present utility model.

As shown in FIG. 1, the present utility model is a projection lamp capable of simultaneously achieving multiple effects, including a housing formed by connecting an upper housing 100 and a lower housing 200, a first projection module 1, a second projection module 2 and a third projection module 3 being arranged in the housing. The first projection module 1 is used for forming the effect of mist and clouds floating in the starry sky, the second projection module 2 is used for forming the effect of twinkling stars, and the third projection module 3 is used for forming the effect of different shapes of quasi-nebulae or clouds.

Figure 2:
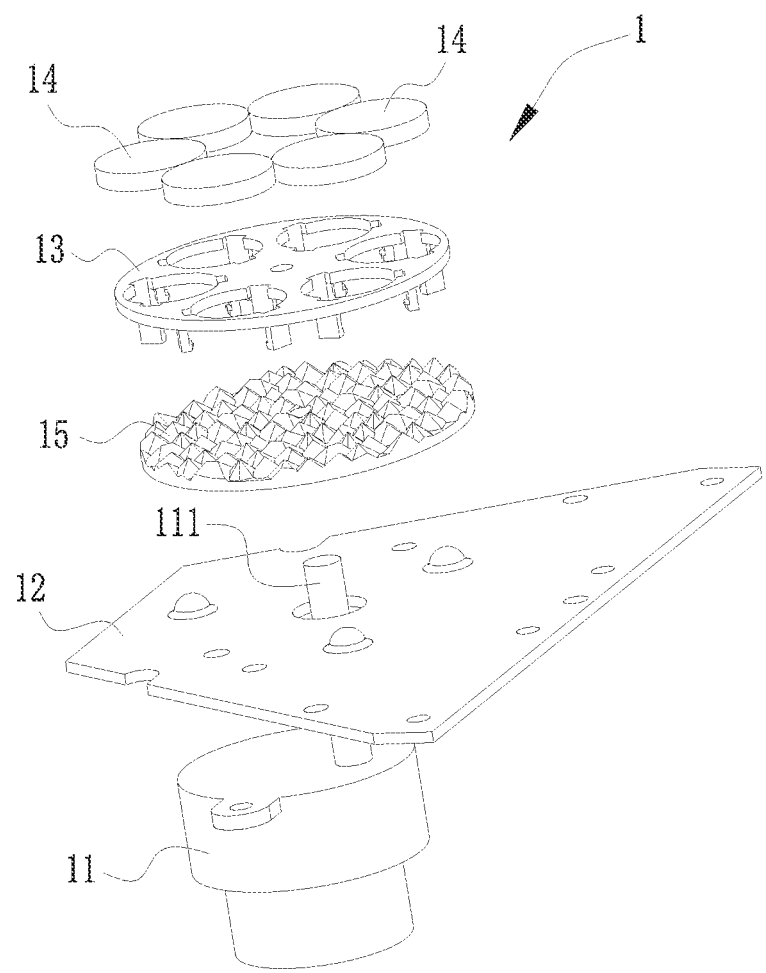
FIG. 2 is a schematic structure diagram of a first projection module in FIG. 1.

Furthermore, as shown in FIG. 2, the first projection module 1 includes a first rotating motor 11, an LED lamp panel 12, a rotating disc 13, a plurality of small lenses 14 and a first transparent sheet 15, the first rotating motor 11 is arranged at the bottom of the LED lamp panel 12, one end of a rotating shaft 111 of the first rotating motor 11 extends out of the LED lamp panel 12, the plurality of small lenses 14 are arranged in the rotating disc 13, and the rotating disc 13 and the first transparent sheet 15 are connected to one end of the rotating shaft 111 in a penetrating mode. It should be noted that the LED lamp panel has at least 3 LED lamp beads, and the 3 LED lamp beads are arranged in a triangular manner. It should be further noted that the first transparent sheet 15 is located under the rotating disc 13.

It should be noted that in order to achieve the effect of mist and clouds floating in the starry sky, the surface of the first transparent sheet in the first projection module can be set to be in a continuous concave-convex uneven shape, or the surface of the first transparent sheet is set to be in a wavelike continuous fluctuating shape. Then the continuous concave-convex uneven shape or the wavelike continuous fluctuating shape arranged on the surface of the first transparent sheet is utilized to achieve the shapes of mist and clouds in the starry sky through projection, and then matched with the rotation of the small lenses on the rotating disc to finally form the effect of mist and clouds floating in the starry sky.

Figure 3:
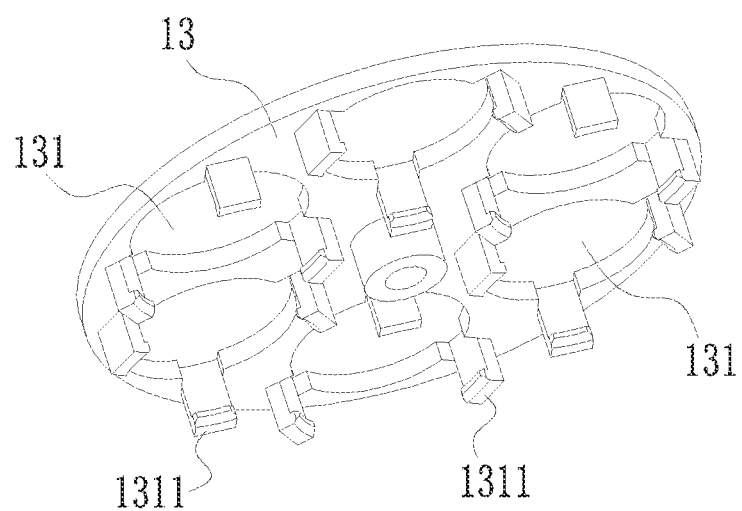
FIG. 3 is a schematic structure diagram of a rotating disc in FIG. 2.

Furthermore, as show in FIG. 2 and FIG. 3, mounting holes 131 with the same number as the small lenses 14 are formed in the rotating disc 13; furthermore, bearing brackets 1311, preferably 3, extending vertically downwards are arranged on the periphery of each mounting hole 131 of the present utility model, and the plurality of small lenses 14 are arranged in the bearing brackets 1311. When in actual use, the number of the small lenses is 6.

Figure 4:
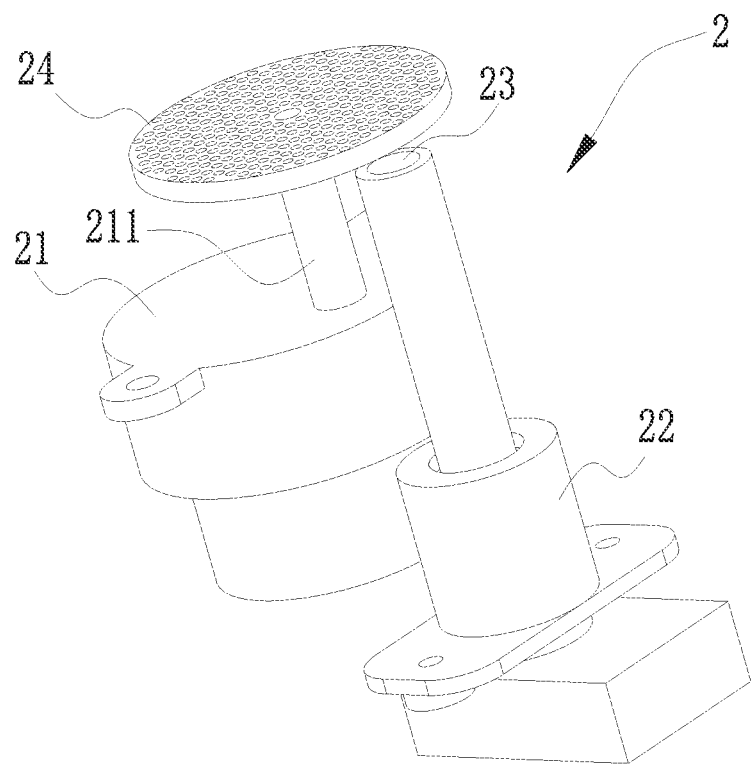
FIG. 4 is a schematic structure diagram of a second projection module in FIG. 1.

Furthermore, as shown in FIG. 4, the second projection module 2 of the present utility model includes a second rotating motor 21, a first laser 22, a DOE optical sheet 23 and a grid sheet 24; the grid sheet 24 is arranged on a rotating shaft 211 extending out of the second rotating motor 21; the first laser 22 is arranged on one side of the second rotating motor 21 and parallel to the second rotating motor 21; and the DOE optical sheet 23 and the first laser 22 are coaxially arranged and the DOE optical sheet is located at the bottom of the grid sheet 24.

It should be noted that the orthographic projection of the DOE optical sheet of the present utility model is located in the grid sheet.

It should be further noted that in order to achieve the effect of twinkling stars, the grid sheet on the second projection module is provided with a plurality of evenly distributed or irregularly distributed through holes, and there are certain gaps between the plurality of through holes. When a beam of light is diffracted by the DOE optical sheet and enters the grid sheet, part of the diffracted light passes through the plurality of through holes, and part of the diffracted light is blocked by the gaps. At this time, with the rotation of the grid sheet, the diffracted light can periodically pass through the through holes, or be blocked by the gaps, and finally the effect of twinkling stars is achieved through projection.

It should be further noted that the DOE optical sheet in the present utility model is a diffractive optical element (DOE). A micro-nano etching process is usually adopted by the DOE optical sheet to form two-dimensionally distributed diffraction units. Each diffraction unit can have a specific morphology, refractive index, etc., to precisely adjust and control laser wavefront phase distribution. After passing through each diffraction unit, laser light is diffracted and interferes at a certain distance (usually infinity or the focal plane of the lens) to form specific light intensity distribution.

Figure 5:
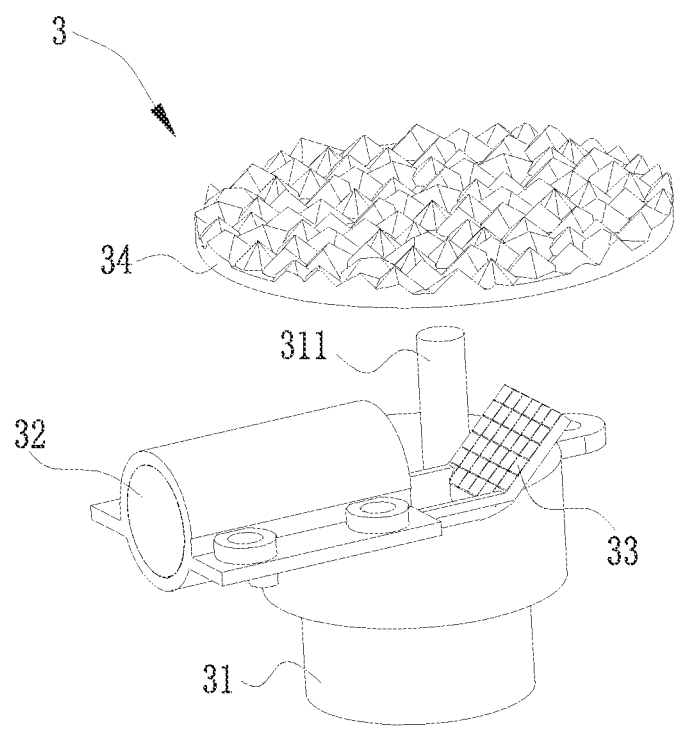
FIG. 5 is a schematic structure diagram of a third projection module in FIG. 1.

Furthermore, as shown in FIG. 5, the third projection module 3 of the present utility model includes a third rotating motor 31, a second laser 32, a reflection sheet 33 and a second transparent sheet 34; the second transparent sheet 34 is arranged on a rotating shaft 311 extending out of the third rotating motor 31; the reflection sheet 33 is arranged at one end of the second laser 32; the second laser 32 is arranged on one side of the third rotating motor 31 and perpendicular to the third rotating motor 31; and a laser beam of light emitted by the second laser 32 and reflected by the reflection sheet 33 is projected from the bottom of the second transparent sheet 34.

It should be noted that as shown in FIG. 5, the continuous irregular concave-convex surface is arranged on the surface of the second transparent sheet 34 of the present utility model. Furthermore, the structure of the concave-convex surface of the second transparent sheet may be similar to the structure of the first transparent sheet in the first projection module, that is, the concave-convex surface is in the continuous concave-convex uneven shape or the wavelike continuous fluctuating shape.

It should be further noted that the angle of the reflection sheet of the third projection module is 45 degrees.

Figure 7:
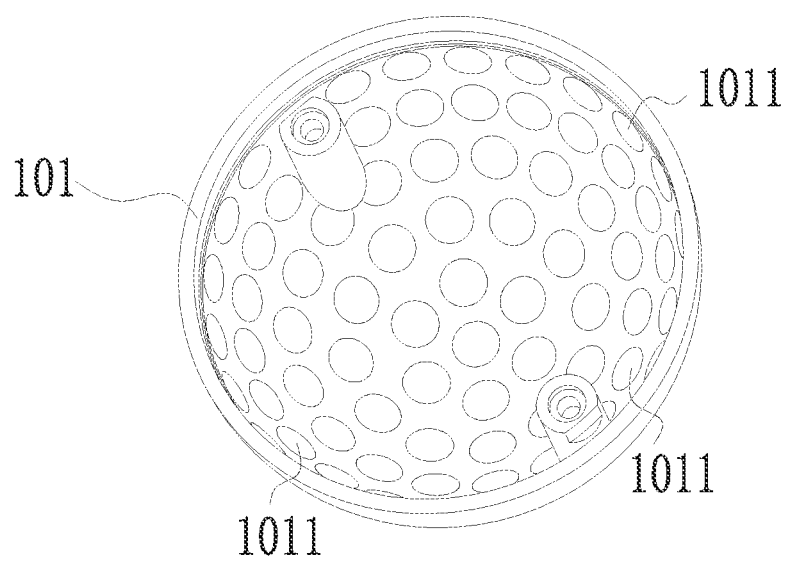
FIG. 7 is a schematic structure diagram of a plurality of optical lenses arranged on the inner surface of a hemispherical transparent cover in FIG. 1.

As shown in FIG. 1, a hemispherical transparent cover 101 is arranged on the surface of the upper housing 100 of the present utility model, and the hemispherical transparent cover and the rotating disc are coaxial in position; furthermore, as shown in FIG. 7, a plurality of optical lenses 1011 are arranged on the inner surface of the hemispherical transparent cover 101 to achieve the better projection effect of mist and clouds floating in the starry sky.

As shown in FIG. 1, a first transparent cover plate 102 and a second transparent cover plate 103 are further arranged on the surface of the upper housing 100 of the present utility model, the second projection module performs projection through the first transparent cover plate, and the third projection module performs projection through the second transparent cover plate.

It should be noted that the projection lamp provided by the present utility model further includes a control circuit, the control circuit being electrically connected to the first projection module, the second projection module and the third projection module respectively.

It should be noted that the control circuit of the present utility model is a general control circuit in the prior art. Furthermore, the control circuit is used for controlling on and off of the first projection module, the second projection module, and the third projection module, and can also control the projection period of each projection module; furthermore, the projection modules of the present utility model can be started individually or the plurality of projection modules can be started in a combined manner.

Figure 6:
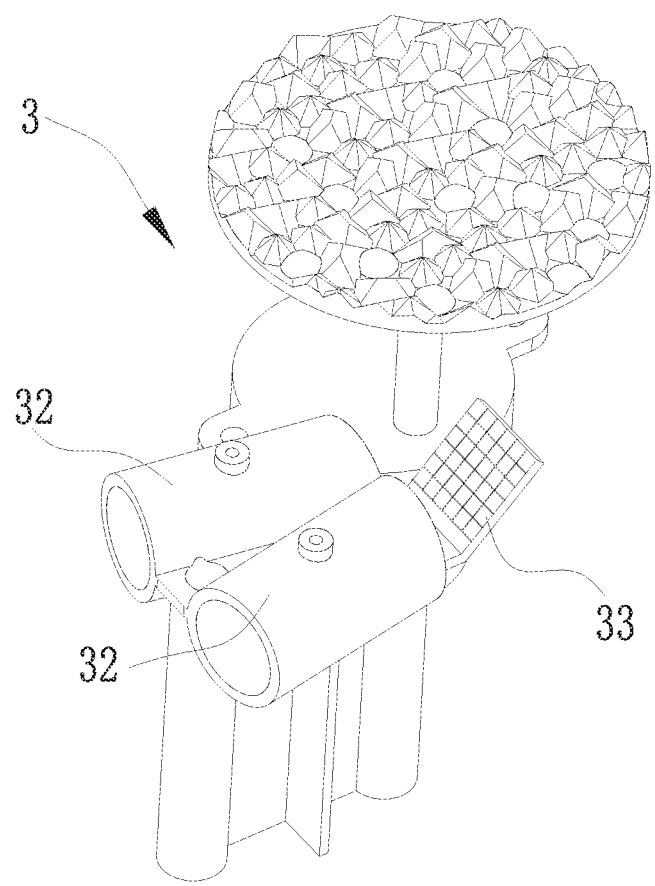
FIG. 6 is a schematic structure diagram of the third projection module adopting dual lasers in the present utility model.

As another implementation method of the present utility model, as shown in FIG. 6, the third projection module 3 of the present utility model can be provided with 2 lasers at the same time. When the 2 lasers are arranged, in order to make the beams of light be more concentrated, the 2 lasers are tilted to each other. Therefore, the beams of light of the 2 lasers may be more concentrated in the reflection sheet, and thus better lighting efficiency is achieved.

Embodiment

Use Method of the First Projection Module:

When a user turns on the first projection module, the 3 LED lamp beads on the LED lamp panel light up. Meanwhile, the first rotating motor rotates to drive the rotating disc and the first transparent sheet to rotate, and the plurality of small lenses mounted on the rotating disc simultaneously rotate along with the first transparent sheet. Bright light of the LED lamp beads passes through the rotating first transparent sheet, enters the plurality of small lenses on the rotating disc, and then is projected to the plurality of optical lenses on the hemispherical transparent cover through the plurality of small lenses. Finally, nebulae and iridescent clouds with floating effect are projected through the hemispherical transparent cover. When the light of the LED passes through the continuous concave-convex uneven shape or wavelike continuous fluctuating shape on the first transparent sheet, the shape of light of the LED will be changed, the changed light will be refracted by the plurality of small lenses on the rotating disc to be focused to the plurality of optical lenses on the hemispherical transparent cover, and finally the plurality of optical lenses expands the projection scope to achieve the projection effect of mist and clouds floating in the starry sky.

Use Method of the Second Projection Module:

When a user turns on the second projection module, the first laser emits the laser beam of light to the DOE optical sheet, and the laser beam of light is diffracted by the DOE optical sheet and then enters the grid sheet with the plurality of evenly distributed or irregularly distributed through holes. Meanwhile, the second rotating motor drives the grid sheet to rotate, the laser beam of light entering the grid sheet is projected into the first transparent cover plate, and the projection effect of twinkling or blinking stars is achieved through the first transparent cover plate.

Use Method of the Third Projection Module:

When a user turns on the third projection module, the second laser emits the laser beam of light to the reflection sheet, and the laser beam of light enters the second transparent sheet through the reflection sheet. Meanwhile, the third rotating motor drives the second transparent sheet to rotate, the laser beam of light entering the second transparent sheet is projected into the second transparent cover plate, and the projection effect of different shapes of nebulae or iridescent clouds is achieved through the second transparent cover plate.

For those skilled in the art, various corresponding modifications and variations may be made according to the above technical scheme and conception, and all the modifications and variations shall be included within the protection scope of the claims of the present utility model.

What is claimed is:

1. A projection lamp capable of simultaneously achieving multiple effects, comprising a housing formed by connecting an upper housing and a lower housing, wherein a first projection module, a second projection module and a third projection module are arranged in the housing; the first projection module includes a first rotating motor, an LED lamp panel, a rotating disc, a plurality of small lenses and a first transparent sheet; the first rotating motor is arranged at the bottom of the LED lamp panel; one end of a rotating shaft of the first rotating motor extends out of the LED lamp panel; the plurality of small lenses are arranged in the rotating disc; the rotating disc and the first transparent sheet are connected to one end of the rotating shaft in a penetrating mode; a continuous irregular concave-convex surface is arranged on the surface of the first transparent sheet; the first projection module is used for forming the effect of mist and clouds floating in the starry sky; the second projection module is used for forming the effect of twinkling stars; and the third projection module is used for forming the effect of different shapes of quasi-nebulae or clouds.

2. The projection lamp capable of simultaneously achieving multiple effects according to claim 1, wherein the second projection module comprises a second rotating motor, a first laser, a DOE optical sheet and a grid sheet; the grid sheet is arranged on a rotating shaft extending out of the second rotating motor; the first laser is arranged on one side of the second rotating motor and parallel to the second rotating motor; and the DOE optical sheet and the first laser are coaxially arranged and the DOE optical sheet is located at the bottom of the grid sheet.

3. The projection lamp capable of simultaneously achieving multiple effects according to claim 2, wherein the orthographic projection of the DOE optical sheet is located in the grid sheet.

4. The projection lamp capable of simultaneously achieving multiple effects according to claim 1, wherein the third projection module comprises a third rotating motor, a second laser, a reflection sheet and a second transparent sheet; the second transparent sheet is arranged on a rotating shaft extending out of the third rotating motor; the reflection sheet is arranged at one end of the second laser; the second laser is arranged on one side of the third rotating motor and perpendicular to the third rotating motor; and a laser beam of light emitted by the second laser and reflected by the reflection sheet is projected from the bottom of the second transparent sheet.

5. The projection lamp capable of simultaneously achieving multiple effects according to claim 4, wherein the continuous irregular concave-convex surface is arranged on the surface of the second transparent sheet.

6. The projection lamp capable of simultaneously achieving multiple effects according to claim 1, wherein mounting holes with the same number as the small lenses are formed in the rotating disc.

7. The projection lamp capable of simultaneously achieving multiple effects according to claim 6, wherein bearing brackets extending vertically downwards are arranged on the periphery of each mounting hole, and the plurality of small lenses are arranged in the bearing brackets.

8. The projection lamp capable of simultaneously achieving multiple effects according to claim 1, wherein a hemispherical transparent cover is arranged on the surface of the upper housing, the hemispherical transparent cover and the rotating disc are coaxial in position, and a plurality of optical lenses are arranged on the inner surface of the hemispherical transparent cover.

9. The projection lamp capable of simultaneously achieving multiple effects according to claim 1, wherein a first transparent cover plate and a second transparent cover plate are further arranged on the surface of the upper housing, the second projection module performs projection through the first transparent cover plate, and the third projection module performs projection through the second transparent cover plate.

10. The projection lamp capable of simultaneously achieving multiple effects according to claim 1, wherein a control circuit is further comprised, the control circuit being electrically connected to the first projection module, the second projection module and the third projection module respectively.

* * * * *